(12) United States Patent
Nania (10) Patent No.: US 8,429,865 B2
(45) Date of Patent: Apr. 30, 2013

(54) WINDOW DISASSEMBLY MECHANISM

(75) Inventor: Adrian Nania, Rochester, MI (US)

(73) Assignee: Webasto SE, Stockdorf (DE)

( * ) Notice: Subject to any disclaimer, the term of this patent is extended or adjusted under 35 U.S.C. 154(b) by 233 days.

(21) Appl. No.: 12/885,839

(22) Filed: Sep. 20, 2010

(65) Prior Publication Data
US 2012/0068500 A1 Mar. 22, 2012

(51) Int. Cl.
*E06B 3/72* (2006.01)
*B60J 1/12* (2006.01)

(52) U.S. Cl.
USPC .............. 52/455; 52/207; 52/203; 52/204.51; 49/380; 49/453; 296/146.16; 296/201

(58) Field of Classification Search ............ 52/455–458, 52/656.1, 656.2, 656.7, 656.4, 656.5, 656.8, 52/656.9, 207, 204.1, 205.5, 204.51, 204.57, 52/202, 203, 212; 296/146.15, 146.16 X, 296/201 X, 190.1; 49/502, 380 X, 413, 128, 49/61–63, 453 X, 454
See application file for complete search history.

(56) References Cited

U.S. PATENT DOCUMENTS

| | | | |
|---|---|---|---|
| 4,518,195 A * | 5/1985 | Tindall et al. .................. | 296/148 |
| 6,260,905 B1 * | 7/2001 | Wagner ..................... | 296/146.16 |
| 6,330,765 B1 * | 12/2001 | Dahl ............................... | 49/453 |
| 6,425,215 B2 * | 7/2002 | Farrar ........................... | 52/204.5 |
| 7,080,874 B2 * | 7/2006 | Farrar et al. .............. | 296/146.16 |
| 7,152,906 B1 * | 12/2006 | Farrar et al. .............. | 296/146.15 |
| 7,254,927 B1 * | 8/2007 | Farrar et al. ................. | 52/741.3 |
| RE40,636 E * | 2/2009 | Weinert et al. ............ | 296/146.16 |
| 7,568,316 B2 * | 8/2009 | Choby et al. .................... | 52/203 |
| 8,091,955 B2 * | 1/2012 | Hill et al. .................... | 296/190.1 |
| 2005/0161972 A1 * | 7/2005 | Farrar et al. .............. | 296/146.15 |

FOREIGN PATENT DOCUMENTS
DE 8031465 U1 3/1981
DE 600 28 662 T2 5/2007

* cited by examiner

*Primary Examiner* — Brian Glessner
*Assistant Examiner* — Beth Stephan
(74) *Attorney, Agent, or Firm* — Fitch, Even, Tabin & Flannery; John M. Naber (57) ABSTRACT

A window assembly for a wall opening can have a center bar removably engaged to a window assembly frame; the center bar having at least one deep channel to receive an edge of at least a first window pane within a portion of a channel depth on a first side and having at least a second channel on a second side of the center bar to receive an edge of a second window pane; and the center bar lowerable over the first window pane edge when disconnected to the frame to a depth within the deep channel to allow the second window pane to be disengaged from the second channel.

10 Claims, 8 Drawing Sheets

WINDOW DISASSEMBLY MECHANISM

FIELD

The present device and methods generally relate to window systems, and specifically to vehicular window assemblies that are easy to assemble and disassemble.

BACKGROUND

Work vehicles, such as tractors, combines, front end loaders, excavators, and the like, typically have enclosed cabs with large window assemblies to provide ventilation and to allow an operator a good view of their work environment. Frequently, these window assemblies provide multiple fixed and/or movable window panes within a perimeter frame.

During vehicle assembly, a window assembly can be attached to a body side wall as a single complete unit or in pieces. In most instances the window assembly is permanently attached from the outside of the vehicle by its perimeter frame with a weatherproof seal using compressible sealing rings, adhesives, and the like. Protective caging can also be added to the outside surface of the window assembly to protect window panes and the vehicle operator from stray impact.

Periodically, it is necessary or desirable to provide maintenance, cleaning, or replacement of various window assembly components. This can be a complicated and impractical task, especially when protective caging is in place. Removal of the caging and the entire assembly is impractical and time consuming for a single person due to its size and weight. Further, removal of the entire window assembly also requires new weatherproofing when reinstalling. The cost and effort associated with such steps can reduce the frequency of needed repairs or maintenance or take the vehicle out of service for extended periods of time.

Despite the current state of the art, further improvements in window assembly maintenance are possible and desired. It would be desirable to provide a window assembly that can be disassembled, in whole or in part and as needed from within the inside of a work vehicle cab without the need to remove any perimeter framing.

SUMMARY

Accordingly, there is provided herein embodiments of a window assembly that are easy to assemble and disassemble.

In one embodiment, a window assembly for a wall opening can have a center bar removably engaged to a window assembly frame; the center bar having at least one deep channel to receive an edge of at least a first window pane within a portion of a channel depth on a first side and having at least a second channel on a second side of the center bar to receive an edge of a second window pane; and the center bar lowerable over the first window pane edge when disconnected to the frame to a depth within the deep channel to allow the second window pane to be disengaged from the second channel.

Additional features can include at least one spring loaded trigger disposed within center bar cavity, wherein the center bar engages to the perimeter frame by the at least one spring loaded trigger end urged into a frame recess. The spring loaded trigger can be fixed in place by threaded studs compressing the trigger against an inside center bar cavity wall by threaded studs extended through threaded bores within the trigger. The threaded studs can extend into the at least one deep channel in the portion of the channel unoccupied by the first window pane in a fixed trigger position, and can be retracted from the at least one deep channel in an unfixed trigger position, whereby the center bar may be lowered over the first window pane the entire depth of the at least one deep channel.

The window assembly can have a variety of fixed and slidable window panes. For example, the first window pane can be a fixed window pane, the second window pane can be slidable along the second channel. A third window pane can be fixed and having an edge disposed within a third channel of the center bar second side.

Other features of the present embodiments can include channels having compressible seals to retain the window panes. The second channel compressible seal can allow the rotation of the second window pane of at least about 5 degrees off a vertical center.

The present embodiments can also include a vehicle having a window assembly having a continuous perimeter frame having an outer side that is sized and shaped to fit closely within a vehicle wall opening and an inner side defining a window opening; a center bar removably engaged to the frame; the center bar having at least one deep channel to receive an edge of at least a first window pane within a portion of a channel depth on a first side and having at least a second channel on a second side of the center bar to receive an edge of a second window pane; and the center bar lowerable over the first window pane edge when disconnected to the frame to a depth within the deep channel to allow the second window pane to be disengaged from the second channel.

A method to remove window panes of a window assembly of the present embodiments can include the steps of disengaging threaded studs of the spring loaded trigger grip; disengaging the trigger grip from the frame; lowering the center bar over the first window pane edge until the deep channel depth is reached; rotating the second window pane from its vertical axis by about at least 5 degrees; removing the second window pane from a second channel compression seal; removing the center bar from a compression seal to an edge of the first window pane; and removing the first window pane from a frame seal.

Other features will become more apparent to persons having ordinary skill in the art to which pertains from the following description and claims.

BRIEF DESCRIPTION OF THE FIGURES

The foregoing features, as well as other features, will become apparent with reference to the description and Figures below, in which like numerals represent elements, and in which.

DETAILED DESCRIPTION

The present device and methods generally relate to window systems, and specifically to vehicular window assemblies that are easy to assemble and disassemble.

In the art, removal of large window assemblies is difficult due to their inherent size and weight. Typical configurations can include three window panes including a lower fixed pane and two upper split panes. Optionally, some panes may be slidable along a track to provide ventilation. Also, protection against stray impact to these assemblies can be included through fixed caging.

In the harsh environment often associated with work vehicles, window panes and tracks can lose visibility, obtain obstructions in the tracks, or broken panes. A center bar having the horizontal sliding window track can collect dirt and debris which cannot be easily removed. Even after a window pane is cleared of debris, replacing it onto a soiled track can make sliding difficult and wear the weatherproofing seals prematurely.

Maintenance to these types of window units usually involves removal of the entire unit from the vehicle. In other words, the perimeter frame and all window panes are removed in tact for disassembly and maintenance while off the vehicle. Not only does the removal of the entire unit place it at risk of further damage while not in place in the vehicle, but also the weather proof seal is breached. This breach is particularly critical along the bottom of the lower window pane. Attempts to remedy this situation could include fabricating the perimeter frame in separate sections to leave the lower window pane in place. However, this provides additional potential leak paths where the perimeter seal is split.

The present embodiments provide a solution to the present design challenges associated with the care and maintenance of these types of window assemblies. In general, in one embodiment, if one of the upper panes needs to be removed, only that pane of glass is removed. Even if the lower fixed pane of glass needs to be removed, it can be reached simply by removing the individual panes above it first. The result is that even the operator of the vehicle can service these window units easily within the confines of a vehicle interior cab. Further, the perimeter seal need never be removed for the life of the vehicle, thus the weather tight seal can be preserved.

Generally, one embodiment of the present design provides for a three glass panel window unit assembly, a center bar separating two upper panels from a fixed lower panel that can be lowered over the lower panel to disengage the upper glass panes from its seals. The upper glass can be removed by rotating the glass pane from its vertical plane to just past the perimeter of the window unit. Once the upper glass panes have been removed, the center bar can also be removed, followed by the removal of the lower pane, if desired. The center bar is removable by use of spring loaded sliding latch mechanisms (trigger) held in place by fixing means such as threaded studs (knobs). The screw pins when in place in the assembled window unit not only restrict movement of the sliding latches, but also holds the center bar above the top edge of the lower glass pane, which in turn holds the upper glass panes within their seals along the unit perimeter and center bar.

The resulting design provides several advantages in the art. The current embodiments reduce the number of splits within the perimeter seal to ensure better long term weatherproofing. Further, all glass removal is internal to the frame. Since the perimeter frame does not need to be removed during routine maintenance joint integrity is not disturbed, further increasing the life of the assembly and the seal.

The simplicity of the present embodiments reduce the number of steps and personnel needed to service the unit. No alignment of threaded fasteners required, removing the potential for cross threading. No tools are needed for assembly or disassembly operations. The self aligning center bar assures a correct home position for glass when reassembling. The threaded studs and knobs have multiple functions. They hold the lower glass pane in place and the latch striker (trigger) while screwed in. When unscrewed, the trigger is allowed to travel through a slot function and the lower glass pane is allowed to slide into a deep seal within the center bar for removal of the upper glass.

Figure 1:
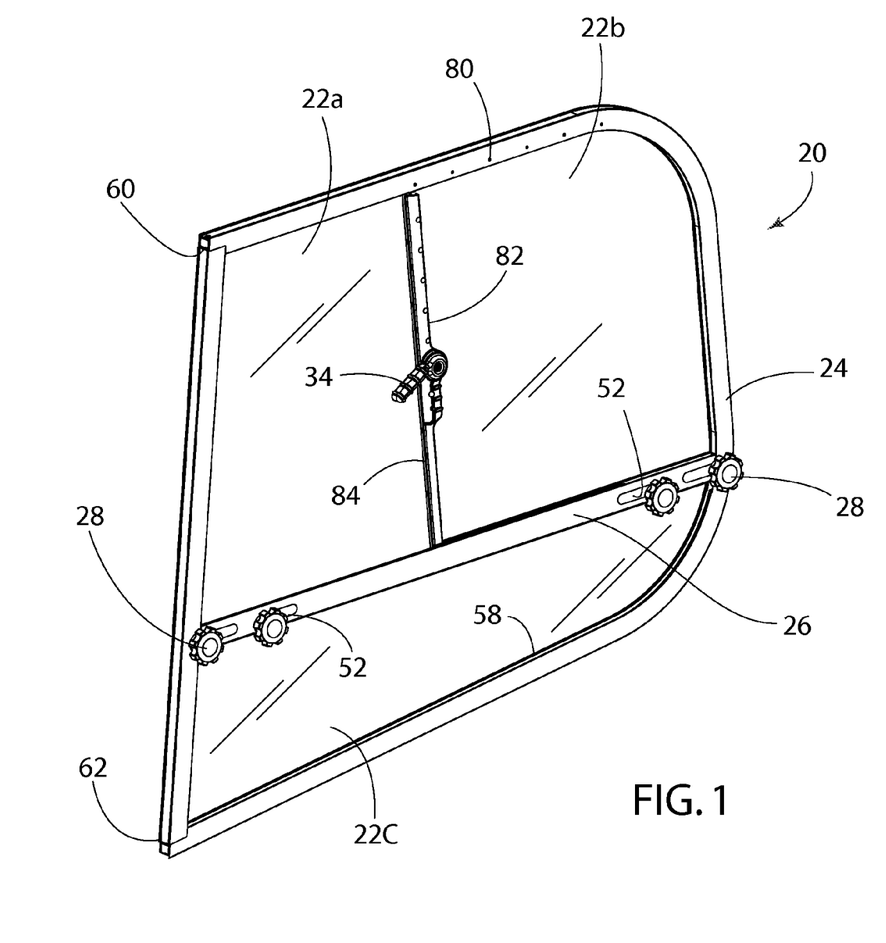
FIG. 1 is a perspective view of a window assembly according to the present embodiments.
Figure 2:
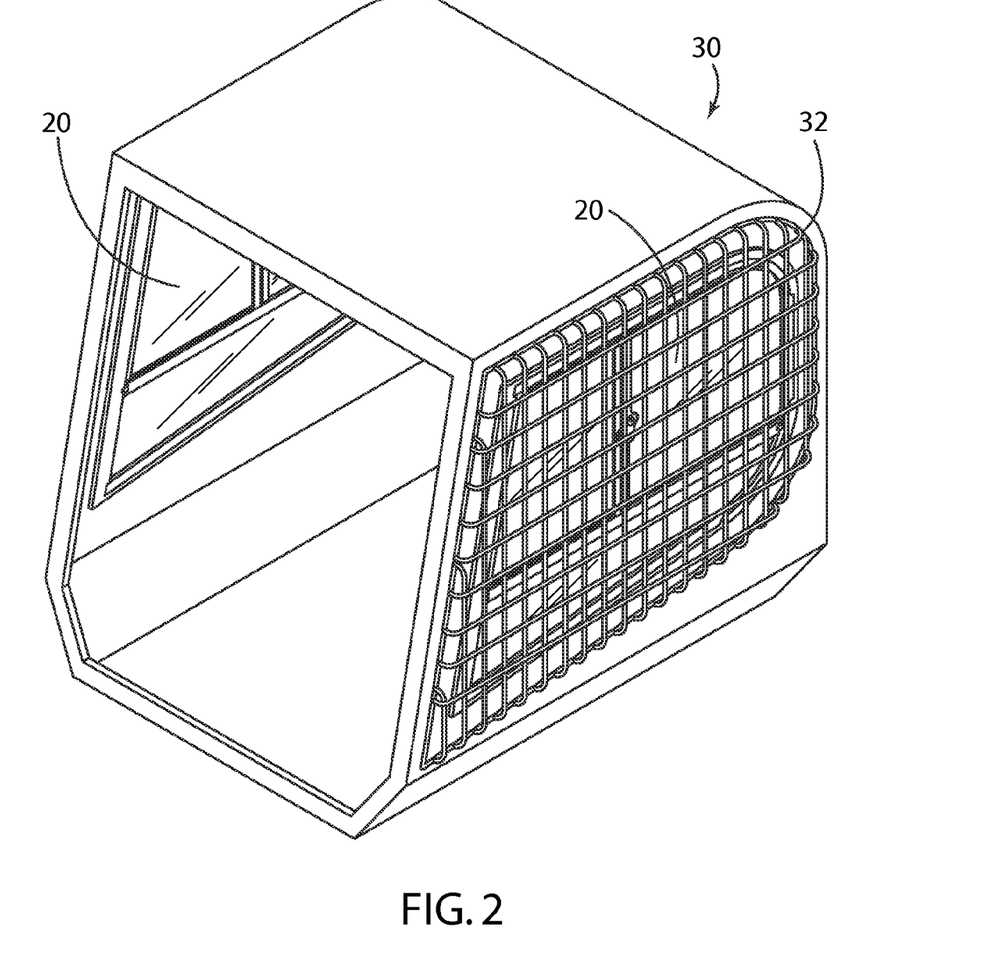
FIG. 2 is a perspective view of a window assembly according to the present embodiments in the environment of a caged cab of a work vehicle.

Turning now to the Figures are shown a window unit generally indicated at 20. The window unit can be attached to any number of wall openings in a variety of applications. Preferably, the wall is upright. In FIG. 2, window unit 20 is shown in environment of a wall of a vehicle cab 30. Window unit 20 can be optionally protected from stray impact by cage 32. As shown in FIG. 1, window unit 20 is preferably formed by a perimeter frame 24 that is fused at all joints. Perimeter frame 24 can be formed from extruded aluminum, composites, plastics, other metals, and combinations thereof. In the illustrated embodiment of FIG. 1, two break points 60 and 62 are shown in perimeter frame 24. Break points 60 and 62 can be sealed by any means to provide a weatherproof seal, and can include welding (such as arc welding or spot welding), gluing, or use of fastening means, such as screws, rivots, and the like. Where fastening means are used, a powder coating over fastened break points 60 and 62 can provide additional weatherproof sealing. Perimeter frame 24 can have an interior channel 66 configured to receive a perimeter channel seal 58. Perimeter channel seal 58 (and all seals to the window panes) can be made of an elastomeric substance suited to provide a friction fit and weather tight seal for window unit 20 window panes. The friction fit is also configured to allow a user to be able to remove the glass pane without use of additional tools and in some instances allow a window pane to slide to create an opening.

Figure 5:
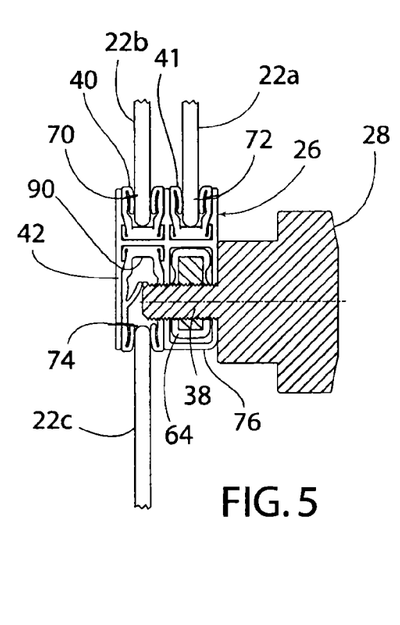
FIG. 5 is a sectional view of a window assembly according to the present embodiments taken along section lines A-A in FIG. 3 in an operational mode.
Figure 6:
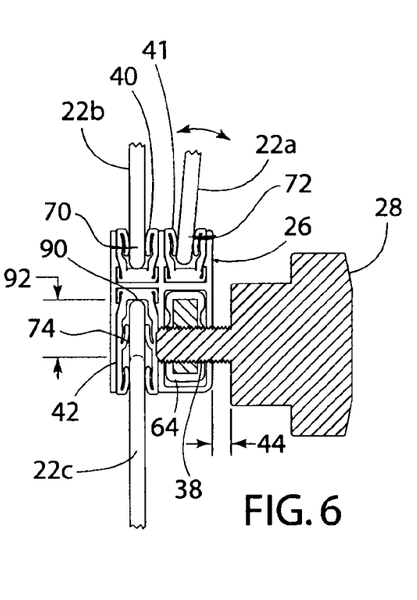
FIG. 6 is a sectional view of a window assembly according to the present embodiments taken along section lines A-A in FIG. 3 in a disassembly mode of FIG. 4.

For illustrative purposes, the embodiments of the present window unit provide two upper panes 22*a* and 22*b*, and a lower pane 22*c*. Panes 22 are fixed in place in the assembled position by perimeter seal 58 and a center bar 26. As shown in the cross sections of center bar 26 in FIGS. 5 and 6, pane 22*a* is held on its lower edge within center bar 26 channel 72 having seal 41. Pane 22*a* is also held in place along its upper edge by a perimeter seal. Pane 22*b* is held on its lower edge within center bar 26 channel 70 having seal 40 and along its top edge by a second perimeter seal (not shown). Pane 22*c* is held in place on its upper edge by seal 42 disposed within deep channel 74. Again, seals 40, 41 and 42 provide a friction fit to hold the pane in place and provide a weather tight seal.

Figure 3:
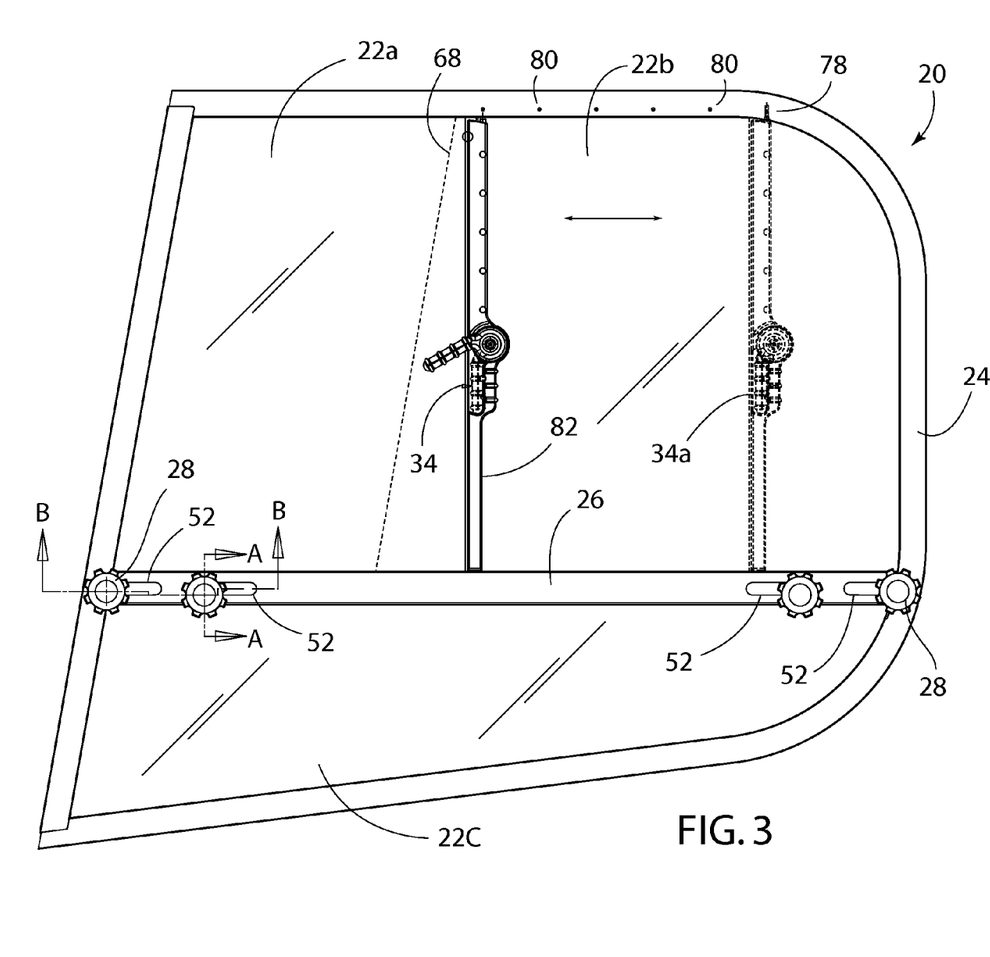
FIG. 3 is a side view of a window assembly according to the present embodiments.
Figure 4:
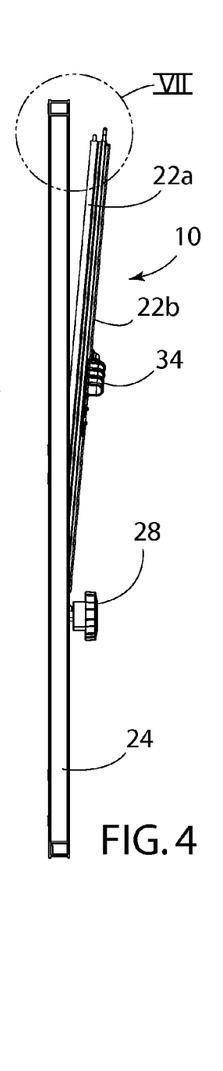
FIG. 4 is a side view of a window assembly according to the present embodiments.
Figure 7:
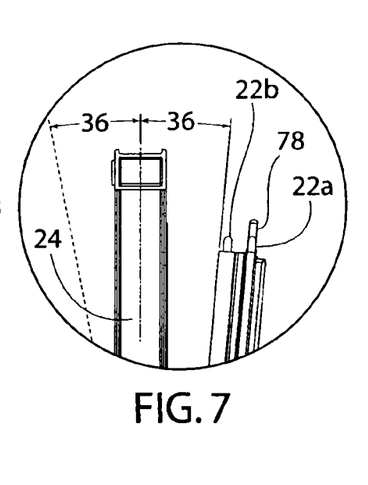
FIG. 7 is a close up view of the highlighted area VII of FIG. 4.
Figure 8:
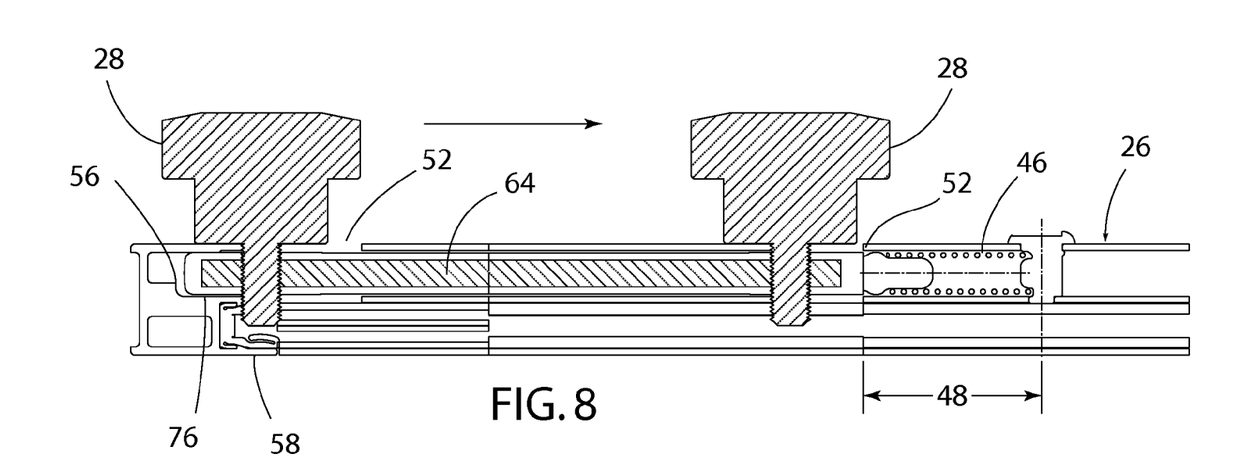
FIG. 8 is a sectional view taken along section lines B-B in FIG. 3 in an operational mode.

Also, as shown, pane 22*a* is slideable from a closed position to an open position 68 (See FIG. 3). Therefore the seal 41 friction fit should allow a user to slide pane 22*a* from an open and closed position while maintaining a seal against weather. An optional vertical bar 82 can be permanently affixed to pane 22a and can have a weather tight seal 84. As illustrated, pane 22a can be held in place along its travel path by use of a latching mechanism actuated by window latch handle 34. Latch handle 34 can be opened (FIG. 1) to allow pane 22a to slide, or closed 34a (FIG. 3) to actuate a mechanism to hold pane 22a in place. Pane 22a can be held in place by a window latch pin 78 (FIGS. 3 and 7), which can be actuated to be inserted into a plurality of perimeter frame 24 latch holes 80. It is noted that the present window configuration is for illustration purposes only and other possible configurations are possible as to the number of window panes and openability of those panes.

In the present embodiments center bar 26 can provide additional features to allow a user to dissemble window unit 20 by a single person without need for additional tools in a few simple steps. In general, adjustments to center bar 26 allow the removal of one or both upper window panes. If the lower window pane is also to be removed, the center bar can be removed to allow easy removal of that lower pane.

Figure 9:
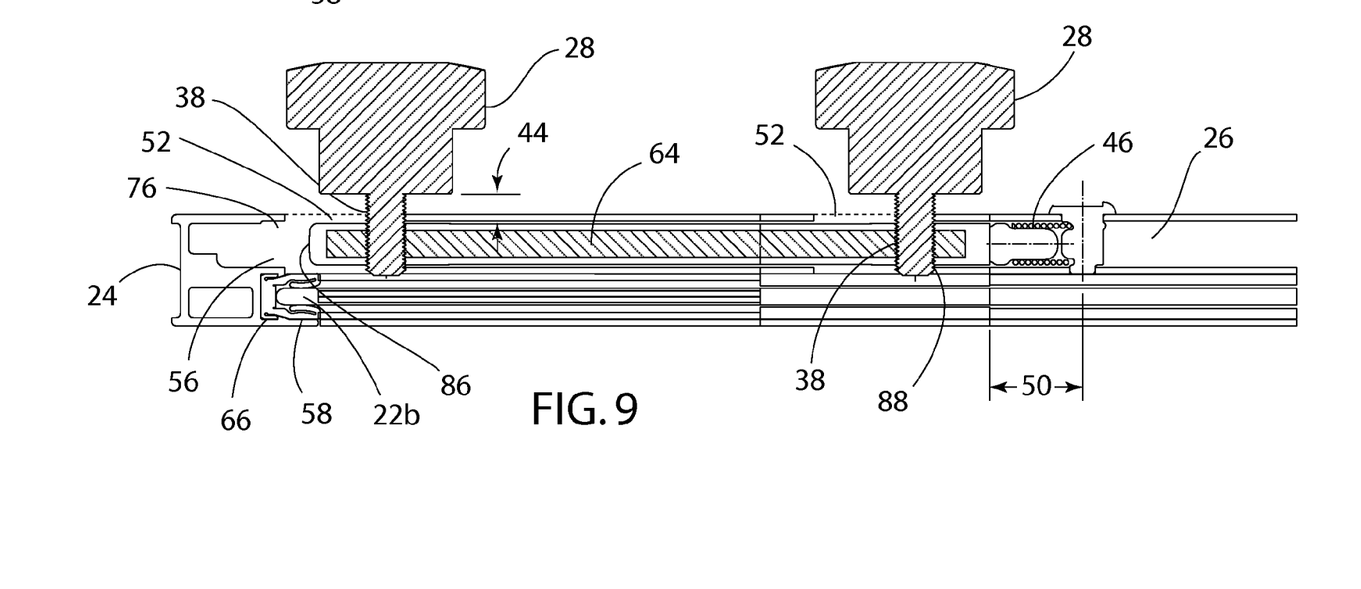
FIG. 9 is a sectional view taken along section lines B-B in FIG. 3 in a disassembly mode of FIG. 4.

As illustrated, center bar 26 can have a spring loaded trigger 64 disposed within center bar channel 76 (See FIGS. 5-6 and 8-9). Trigger 64 is slidable within channel 76 from a closed position (FIG. 8) to an open position (FIG. 9). Spring 46 urges trigger 64 to a closed position. The distance of travel can be defined by a length of a slot 52 between distance 48 to 50. The distance between 48 and 50 can range from about 1 to 5 centimeters and preferably is about 2 centimeters. Travel to a closed position can also be defined by a trigger end 86 extending into a perimeter frame recess 56 and to its open position defined by trigger end 86 removed from perimeter frame access 56.

As shown in the Figures, knobs 28 can be attached to a threaded stud 38 within a threaded bore 88 within spring loaded trigger 64. As knobs 28 are rotated to a closed position, the grip of the trigger 64 against center bar trigger channel is increased to hold trigger 64 in place. Alternately, knob 28 can also clamp onto perimeter frame 24 where knob 28 extends to the end of center bar 26. While the knobs 28 are rotated to secure trigger 64, threaded stud 38 is configured to concurrently extend into deep channel 72 to prevent window pane 22c from travel into channel 74 to channel 74 bottom 90 (See FIG. 5). In other words, pane 22c can travel no further into channel 74 than to the edge of the threaded stud 38. As knob 28 is turned to its released position, the grip of trigger 64 against center bar trigger channel 76 is released allowing a user, if desired, to overcome the spring action of spring 46 to remove trigger end from the perimeter frame 24 (FIG. 9). Additionally, as knob 28 is turned to its released position a distance 44 (FIG. 6), threaded stud 38 retracts from deep channel 74. Knob 28 and threaded stud 38 can be made of a variety of materials such as metals and thermoplastic composites. It is also noted that although the stud is described as threaded, other types of mechanism may be used to fix and retract the stud from the channel.

The retraction of the threaded stud allows center bar 26 to be lowered further down onto pane 22c to the bottom of channel 74. The distance lowered (e.g., distance 92 of FIGS. 5 and 6) is configured to be a dimension sufficient to release an upper edge of pane 22a and 22b from perimeter seal 58. Thus, once center bar 26 is lowered to the top edge of pane 22c, panes 22a and 22b are allowed a slight rotation to clear the perimeter frame 24, thus allowing removal of panes 22a and 22b. Rotation 36 (FIGS. 6 and 7) is limited by the flex allowed by elastic seals 40 and 41, and is preferably at least about 5 degrees off vertical center in either direction. Further, flex can be obtained by the allowed elasticity of seal 41. Once panes 22a and 22b are removed, center bar 26 can be removed to allow removal of pane 22c.

As described above, the window units of the present embodiments can be easily assembled and disassembled multiple times throughout the life of the unit by a single individual using minimal steps. It is noted that the following description of the disassembly is the reverse order of the initial and subsequent re-assembly of the window unit. In each instance, not all panes may need to be removed for servicing, replacement or cleaning. Nevertheless, for purposes of this description, the disassembly of all three panes is described.

To begin disassembly, knobs 28 can be loosened. For typical threaded stud applications, this would be to turn them counter-clockwise until they both released the clamp load (grip) of trigger 64 from the center bar 26 (or alternately the perimeter frame 24 where knob 28 extends to the end of center bar 26) and cleared deep channel 74. Once released, knobs 28 are slid along travel path 52 against the urging of spring 46 to remove trigger end 86 from perimeter frame recess 56.

These steps allow center bar 26 to be lowered further down onto lower pane 22c since more of deep channel 74 is exposed. The lowering of center bar 26 drops far enough for the tops of panes 22a and 22b to clear the perimeter seal 58. Sliding pane 22a is positioned to clear any side perimeter seal 58 so that pane 22a is only attached within the seal of center bar 26 (seal 41). Pane 22a can then be rotated out far enough to clear perimeter frame 24 and pulled out of seal 41. Once pane 22a has been removed, pane 22b can similarly be removed by sliding it forward to clear any additional perimeter seals, then rotated and removed.

Figure 10:
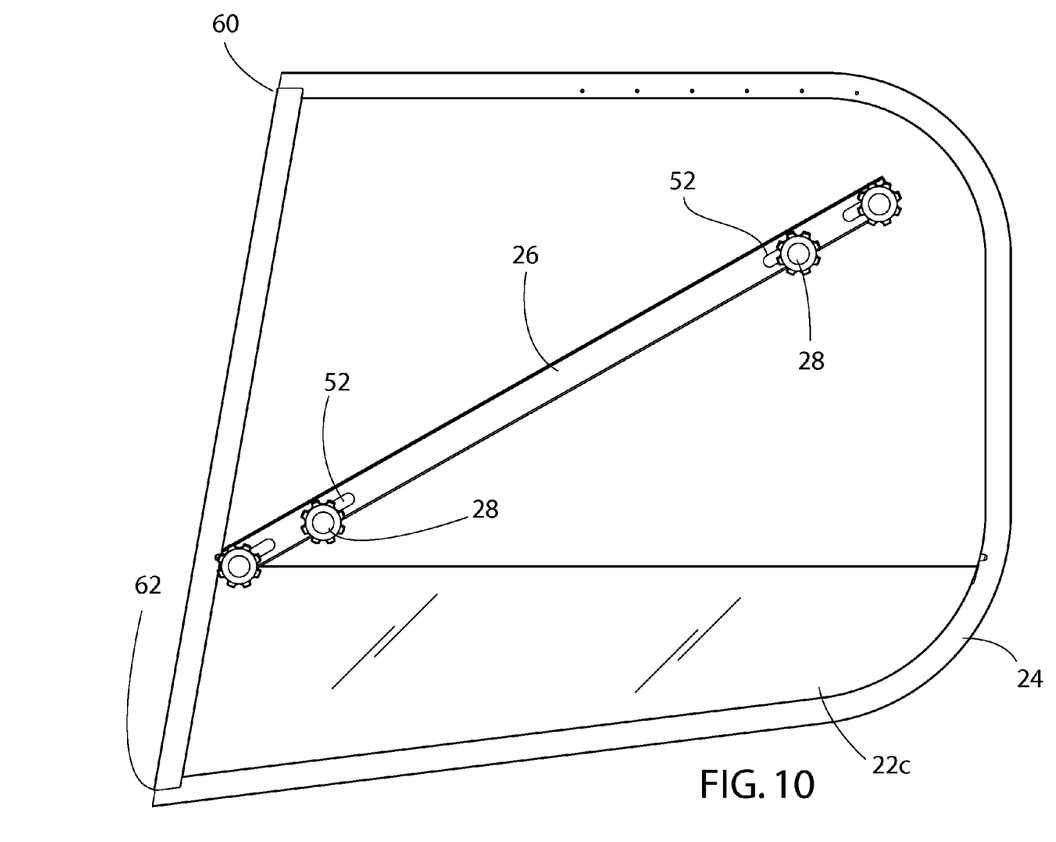
FIG. 10 is a side view of a partially disassembled window assembly according to the present embodiments removing a center bar.

FIG. 10 illustrates the next step to remove center bar 26. It can be rotated out in any manner that is not blocked by the geometry of perimeter frame 24. Thus, as shown in FIG. 10, this would involve rotating center bar 26 off the rear of perimeter frame 24.

Figure 11:
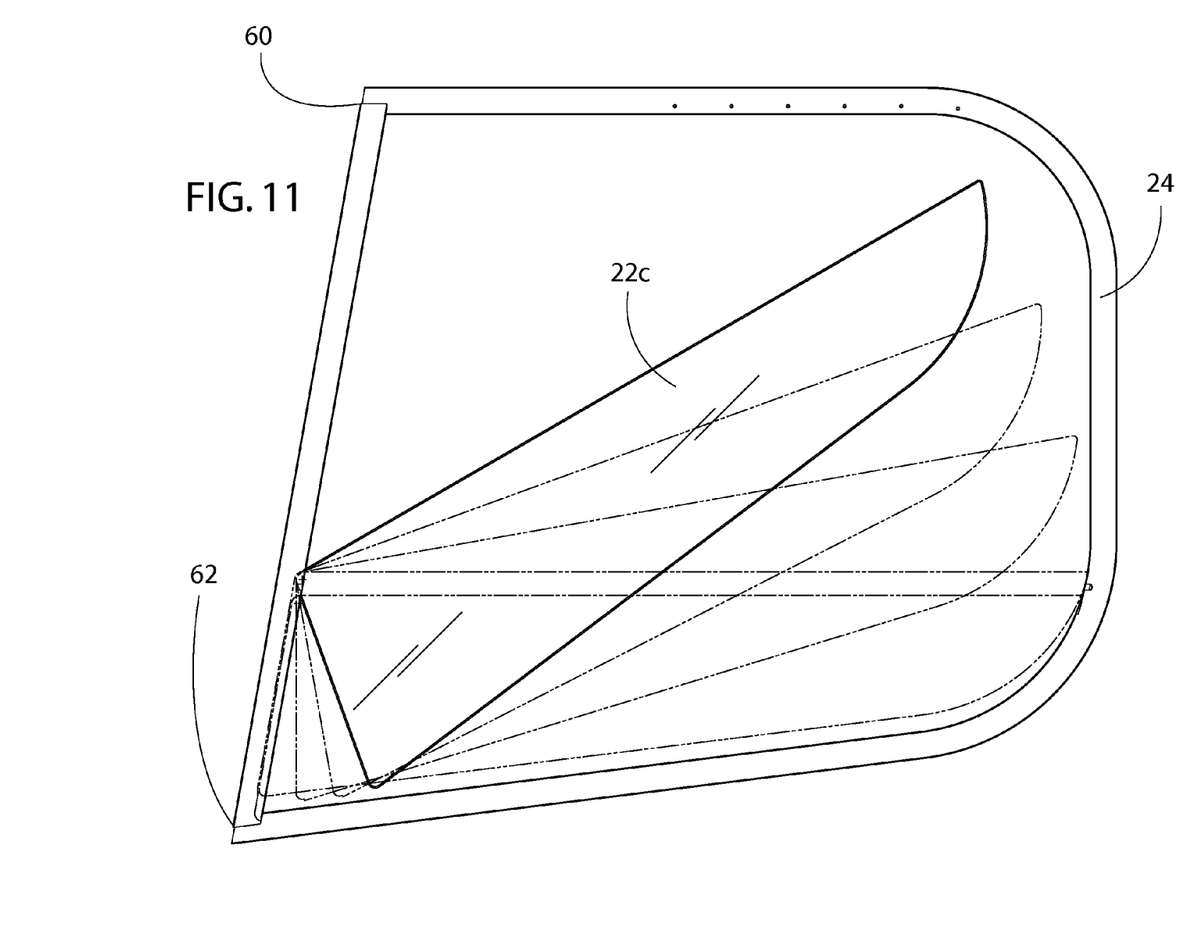
FIG. 11 is a side view of a partially disassembled window assembly according to the present embodiments removing a lower window pane.
Figure 12:
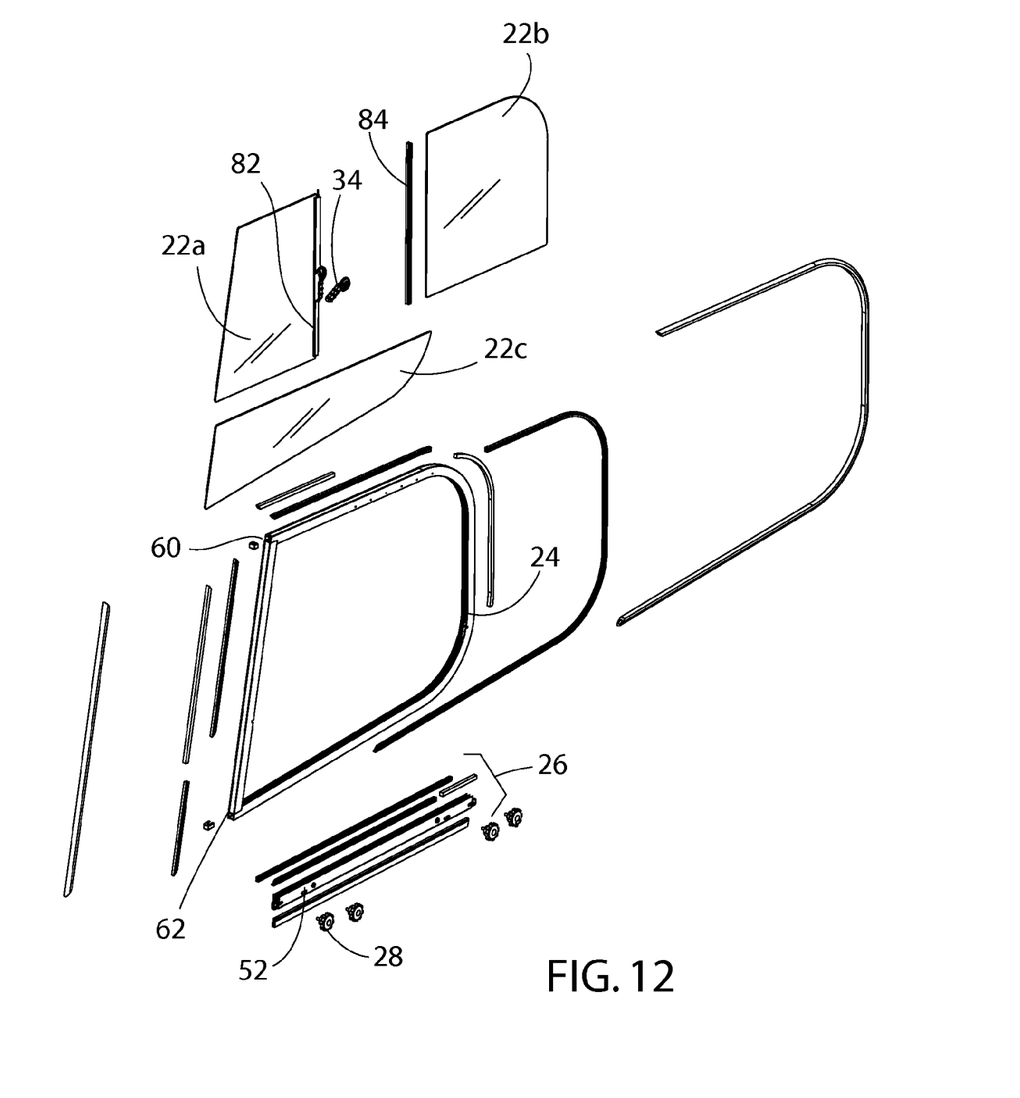
FIG. 12 is an exploded perspective view of a window assembly according to the present embodiments.

A final step to remove pane 22c is illustrated in FIG. 11. As shown, pane 22c can be rotated out in any manner that is not blocked by the geometry of perimeter frame 24. Thus, as shown in FIG. 10 this would also involve rotating pane 22c off the rear of perimeter frame 24.

While the embodiments and methods have been described in conjunction with specific embodiments, it is evident that many alternatives, modifications, and variations will be apparent to those skilled in the art in light of the foregoing description.

I claim:

1. A window assembly for a wall opening, comprising:
   a window assembly frame;
   a center bar removably engaged to the window assembly frame;
   a least a first window pane and a second window pane, each pane having an outer edge received within the window assembly frame;
   the center bar having a first channel, and a second channel opposite the first channel
   the first window pane having an inner edge received within the first channel;
   the second window pane having an inner edge received in the second channel; and
   the center bar movable from an engaged position in which the center bar is engaged with the window assembly frame and receives the window panes within the channels, and a disengaged position in which the center bar is movable within the window assembly frame such that the center bar is lowered onto the second window pane and allows for the center bar to be removed from the window frame and to allow the removal of the at least one first pane from the window assembly frame.

2. The window assembly of claim 1, further comprising at least one spring loaded trigger disposed within a cavity of the center bar, wherein the center bar engages to a perimeter of the window assembly frame by the at least one spring loaded trigger end urged into a window assembly frame recess.

3. The window assembly of claim 2, wherein the spring loaded trigger is fixed in place by threaded studs compressing the trigger against an inside wall of the center bar cavity by threaded studs extended through threaded bores within the trigger.

4. The window assembly of claim 3, wherein the threaded studs extend into the second channel in the portion of the second channel unoccupied by the second window pane in a fixed trigger position, and are retracted from the second channel in an unfixed trigger position, whereby the center bar may be lowered over the second window pane the entire depth of the second channel.

5. A method to remove window panes from the window assembly of claim 4, comprising the steps of:
   disengaging threaded studs of the spring loaded trigger grip;
   disengaging the trigger grip from the window assembly frame;
   lowering the center bar over the second window pane edge until a second channel depth is reached;
   rotating the first window pane from its vertical axis by about at least 5 degrees;
   removing the first window pane from a first channel compression seal;
   removing the center bar from a compression seal to an edge of the second window pane; and
   removing the second window pane from a frame seal.

6. The window assembly of claim 1, wherein the second window pane is a fixed window pane.

7. The window assembly of claim 1 further comprising the center bar having a third channel and a third window pane that is fixed and having an edge disposed within the third channel of the center bar.

8. The window assembly of claim 1, wherein the channels further comprise a compressible seal to retain the window panes.

9. The window assembly of claim 8, wherein the seal of the first channel compressible seal allows rotation of the first window pane of at least about 5 degrees off a vertical center.

10. A vehicle having a window assembly, comprising:
   a continuous perimeter window assembly frame having an outer side that is sized and shaped to fit closely within a vehicle wall opening and an inner side defining a window opening;
   a center bar removably engaged to the window assembly frame;
   a least a first window pane and a second window pane, each pane having an outer edge received within the window assembly frame;
   the center bar having a first channel, and a second channel opposite the first channel
   the first window pane having an inner edge received within the first channel;
   the second window pane having an inner edge received in the second channel; and
   the center bar movable from an engaged position in which the center bar is engaged with the window assembly frame and receives the window panes within the channels, and a disengaged position in which the center bar is movable within the window assembly frame such that the center bar is lowered onto the second window pane and allows for the center bar to be removed from the window frame and to allow the removal of the at least one first pane from the window assembly frame.

* * * * *